(12) United States Patent
Hotta et al.

(10) Patent No.: US 11,431,035 B2
(45) Date of Patent: Aug. 30, 2022

(54) SECONDARY BATTERY, BATTERY PACK AND VEHICLE

(71) Applicant: Kabushiki Kaisha Toshiba, Minato-ku (JP)

(72) Inventors: Yasuyuki Hotta, Oota (JP); Shinsuke Matsuno, Minato (JP); Hayato Seki, Kawasaki (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/932,197

(22) Filed: Feb. 16, 2018

(65) Prior Publication Data
US 2018/0269534 A1 Sep. 20, 2018

Related U.S. Application Data

(63) Continuation-in-part of application No. 15/692,998, filed on Aug. 31, 2017.

(30) Foreign Application Priority Data

Mar. 17, 2017 (JP) .............................. JP2017-053457
Sep. 7, 2017 (JP) .............................. JP2017-172247

(51) Int. Cl.
*H01M 10/36* (2010.01)
*H01M 4/60* (2006.01)
(Continued)

(52) U.S. Cl.
CPC .......... *H01M 10/36* (2013.01); *C01G 23/047* (2013.01); *H01M 4/483* (2013.01); *H01M 4/602* (2013.01);
(Continued)

(58) Field of Classification Search
CPC ........ H01M 10/0564; H01M 10/0568; H01M 10/0569; H01M 2300/0002
See application file for complete search history.

(56) References Cited

U.S. PATENT DOCUMENTS 6,403,253 B1  6/2002  Wainwright et al.
7,541,114 B2 * 6/2009  Ohzuku ............... C01G 23/005
                                                    429/218.1
(Continued)

FOREIGN PATENT DOCUMENTS

JP      9-508490 A    8/1997
JP   2000-77073 A    3/2000
(Continued)

OTHER PUBLICATIONS

Extended European Search Report dated Oct. 19, 2017 in Application No. 17188752.4.
(Continued)

*Primary Examiner* — Ula C Ruddock
*Assistant Examiner* — Thomas H. Parsons
(74) *Attorney, Agent, or Firm* — Oblon, McClelland, Maier & Neustadt, L.L.P.

(57) ABSTRACT

In one embodiment, a secondary battery is provided, which includes an electrolytic solution, and a positive electrode and a negative electrode which are immersed in the electrolytic solution. The electrolytic solution contains water, an electrolyte salt, and at least one kind of an organic solvent with a relative permittivity of not more than 42. The relative permittivity of the electrolytic solution fractionated when converted according to a volume fraction is not more than 78.50.

18 Claims, 7 Drawing Sheets

(51) Int. Cl.

| | |
|---|---|
| *H01M 4/48* | (2010.01) |
| *C01G 23/047* | (2006.01) |
| *H01M 10/38* | (2006.01) |
| H01M 4/505 | (2010.01) |
| H01M 4/525 | (2010.01) |
| H01M 4/02 | (2006.01) |
| H01M 4/485 | (2010.01) |
| H01M 4/58 | (2010.01) |

(52) U.S. Cl.
CPC ............ *H01M 10/38* (2013.01); *H01M 4/485* (2013.01); *H01M 4/505* (2013.01); *H01M 4/525* (2013.01); *H01M 4/5825* (2013.01); *H01M 2004/027* (2013.01); *H01M 2004/028* (2013.01); *H01M 2220/20* (2013.01); *H01M 2300/0002* (2013.01); *H01M 2300/0085* (2013.01); *H01M 2300/0088* (2013.01)

(56) References Cited

U.S. PATENT DOCUMENTS

| | | | |
|---|---|---|---|
| 10,629,958 B2 * | 4/2020 | Kawai | H01M 10/26 |
| 2010/0216019 A1 * | 8/2010 | Morishima | H01M 10/0568 429/207 |
| 2010/0248078 A1 | 9/2010 | Beard | |
| 2011/0266489 A1 | 11/2011 | Birke et al. | |
| 2012/0100417 A1 | 4/2012 | Ramprasad | |
| 2012/0156572 A1 | 6/2012 | Hojo et al. | |
| 2012/0183836 A1 * | 7/2012 | Harada | C01G 23/047 429/149 |
| 2014/0308544 A1 | 10/2014 | Wessells et al. | |
| 2016/0156023 A1 | 6/2016 | Wessells et al. | |
| 2016/0190588 A1 | 6/2016 | Wessells et al. | |
| 2016/0190629 A1 | 6/2016 | Wessells et al. | |
| 2016/0233551 A1 | 8/2016 | Wessells et al. | |
| 2017/0222272 A1 | 8/2017 | Takami et al. | |
| 2017/0271682 A1 | 9/2017 | Matsuno et al. | |
| 2017/0271717 A1 | 9/2017 | Yamashita et al. | |

FOREIGN PATENT DOCUMENTS

| | | | |
|---|---|---|---|
| JP | 2003-1705 A | 1/2003 | |
| JP | 2003-017057 A | 1/2003 | |
| JP | 2005-71807 A | 3/2005 | |
| JP | 2006-127848 A | 5/2006 | |
| JP | 2011-44312 A | 3/2011 | |
| JP | 4691966 B2 | 6/2011 | |
| JP | 5055390 B2 | 10/2012 | |
| JP | 2012-531018 A | 12/2012 | |
| JP | 5437399 B2 | 3/2014 | |
| JP | 2014-63596 A | 4/2014 | |
| JP | 2014-523072 A | 9/2014 | |
| JP | WO2015/129408 A1 | 9/2015 | |
| JP | 2015-195202 A | 11/2015 | |
| JP | 5861635 B2 | 2/2016 | |
| JP | 2016-42419 A | 3/2016 | |
| JP | 2016-519842 A | 7/2016 | |
| JP | 2016-146341 A | 8/2016 | |
| JP | 2016192279 * | 11/2016 | |
| JP | WO 2016/114141 A1 | 12/2017 | |
| KR | 101375611 * | 3/2014 | |
| KR | 101375611 B1 * | 3/2014 | |
| WO | WO 2013/094689 A1 | 6/2013 | |
| WO | WO-2013094689 A1 * | 6/2013 | ............ H01M 10/36 |
| WO | WO2017105578 A2 * | 6/2017 | ............ H01M 4/525 |

OTHER PUBLICATIONS

Haegyeom Kim, et al., "Aqueous Rechargeable Li and Na Ion Batteries", Chemical Reviews, vol. 114, No. 23, XP055414196, 2014, pp. 11788-11827.

S. Liu, et al., "Rechargeable Aqueous Lithium-Ion Battery of $TiO_2$/$LiMn_2O_4$ with a High Voltage" Journal of the Electrochemical Society, vol. 158, No. 12, 2011, pp. A1490-A1497.

Japanese Office Action dated Jul. 31, 2020 in Japanese Patent Application No. 2017-172247, 6 pages.

Office Action dated May 10, 2021 in corresponding Japanese Patent Application No. 2017-172247, 6 pages.

* cited by examiner

SECONDARY BATTERY, BATTERY PACK AND VEHICLE

CROSS-REFERENCE TO RELATED APPLICATION

This application is a continuation-in-part of U.S. application Ser. No. 15/692,998, filed on Aug. 31, 2017 which is based upon and claims the benefit of priority from the prior Japanese Patent Application No. 2017-053457, filed on Mar. 17, 2017, and the prior Japanese Patent Application No. 2017-172247, filed on Sep. 7, 2017, the entire contents of which are incorporated herein by reference.

FIELD

Embodiments described herein relate generally to a secondary battery, a battery pack and a vehicle.

BACKGROUND

A nonaqueous electrolyte battery using a carbon material or a lithium titanium oxide as a negative electrode active material and a layered oxide containing nickel, cobalt, manganese and so on as a positive electrode active material, particularly a lithium secondary battery has been put into a practice as a power source in a wide field. A form of the nonaqueous electrolyte battery like this ranges from a small device for various electronic devices to a large apparatus for an electric car. As the electrolytic solutions of the lithium secondary batteries like these, a nonaqueous organic solvent in which ethylene carbonate, methyl ethyl carbonate and so on are mixed is used, differently from a nickel hydrogen battery or a lead storage battery. The electrolytic solution using these solvents has higher resistance to oxidation and resistance to reduction than an aqueous electrolytic solution, and thereby the electrolysis of the solvent is hardly generated. For the reason, in the nonaqueous secondary battery, it is possible to realize a high electromotive force. But since many of the organic solvents are combustible materials, various countermeasures have been required in order to improve safety of a secondary battery using an organic solvent.

On the other hand, when an aqueous electrolytic solution is used, it is possible to provide a secondary battery having higher safety compared with a case in which an organic solvent is used. However, in the aqueous electrolytic solution, a potential range in which charge/discharge of the battery is performed is to be set within a potential range in which an electrolysis reaction of water contained as the solvent is not generated, and accordingly, it is difficult to obtain a sufficient energy density as a battery, and as a result a charge/discharge efficiency of the battery has been low.

DETAILED DESCRIPTION

Figure 1:
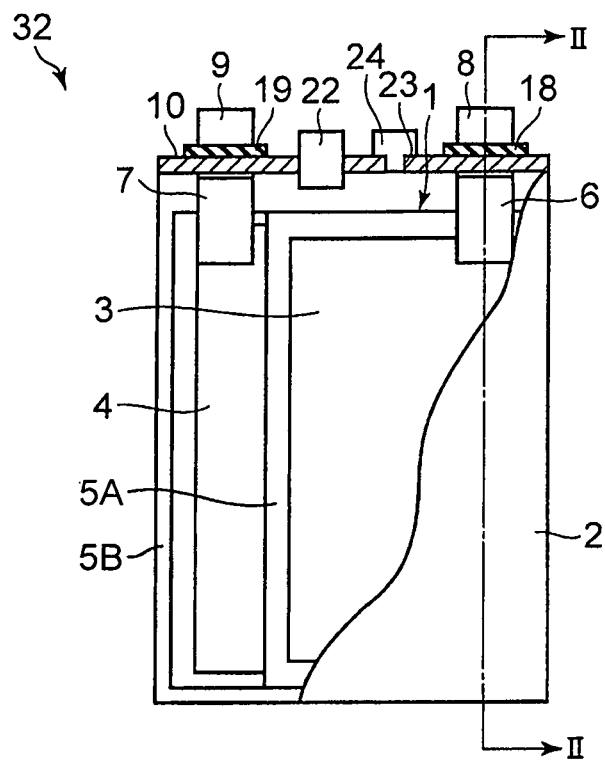
FIG. 1 is a sectional view schematically showing an example of a secondary battery according to a first embodiment.

According to one embodiment, a secondary battery is provided, which includes an electrolytic solution, and a positive electrode and a negative electrode which are immersed in the electrolytic solution. The electrolytic solution contains water, an electrolyte salt, and at least one kind of an organic solvent with a relative permittivity of not more than 42. The relative permittivity of the electrolytic solution fractionated when converted according to a volume fraction is not more than 78.50.

Hereinafter, further embodiments of the present invention will be described with reference to the drawings. Ones with the same symbols show the corresponding ones. In addition, the drawings are schematic or conceptual, and accordingly, the relation between a thickness and a width of each portion, and a ratio of sizes between portions are not necessarily identical to those of the actual ones. In addition, even when the same portions are shown, the dimensions and the ratio thereof may be shown different depending on the drawings.

First Embodiment

A secondary battery according to a first embodiment contains a positive electrode, a negative electrode, and an electrolytic solution. As this electrolytic solution, an electrolytic solution which contains water, an electrolyte salt and an organic solvent with a relative permittivity of not more than 42, and has a relative permittivity converted according to a volume fraction of not more than 78.50. The electrolytic solution with a specified relative permittivity like this is used, and thereby it is possible to provide a secondary battery with improved efficiency which does not fire and has high safety.

In addition, this secondary battery may further contain a container for housing a separator, the positive electrode, the negative electrode and the electrolytic solution.

Hereinafter, the electrolytic solution, the negative electrode, the positive electrode, the separator, and the container will be described in detail.

1) Electrolytic solution The electrolytic solution contains water, the electrolyte salt, and at least one kind of the organic solvent with a relative permittivity of not more than 42, and has a composition in which a relative permittivity to be estimated from an additive property to a volume fraction of the mixed solvent is not more than 78.50. Water might be described as an aqueous solvent. In addition, an electrolytic solution containing an aqueous solvent might be described as an aqueous electrolytic solution.

The electrolytic solution is prepared by blending the organic solvent into the aqueous solvent and making the electrolyte salt to be dissolved. In order to suppress the electrolysis of the electrolytic solution, LiOH or $Li_2SO_4$ or the like is added to adjust PH of the electrolytic solution. pH is preferably within a range of 1-14, and is more preferably within a range of 2-14. In addition, polymer material may be added to the electrolytic solution. When the polymer material is added, to cause the electrolytic solution to gelate, and thereby the electrolytic solution which hardly cause liquid leakage may be prepared. As the polymer material, polyvinylidene fluoride (PVdF), polyacrylonitrile (PAN), polyethylene oxide (PEO) and so on can be listed.

In the above-described the electrolytic solution, an amount of the aqueous solvent is preferably not less than 1 mol, for 1 mol of the electrolyte salt acting as a solute, and is more preferably not less than 3.5 mol.

Whether or not the aqueous solvent is contained in the electrolytic solution can be confirmed by a GC-MS (Gas Chromatography Mass Spectrometry) measurement. In addition, a salt concentration and an amount of the aqueous solvent in the electrolytic solution can be measured by an ICP (Inductively Coupled Plasma) emission analysis method or the like, for example. A specified amount of the electrolytic solution is taken, and a salt concentration contained therein is calculated, and thereby a mol concentration (mol/L) thereof can be calculated. In addition, the specific gravity of the electrolytic solution is measured, and thereby the numbers of mols of the solute and the solvent can be calculated.

It is preferable that the electrolyte salt is dissolved at a concentration of 1-12 M. Here, M expresses mol/L. The electrolyte salt used in a lithium secondary battery is a lithium salt, for example. The lithium salt contains LiCl, LiBr, LiOH, $Li_2SO_4$, $LiNO_3$, LiTFSA (lithium trifluoromethanesulfonylamide), LiBETA (lithium bispentafluoroethanesulfonylamide), LiFSA (lithium bisfluorosulfonylamide), $LiB[(OCO)_2]_2$, and so on, for example. It is preferable to contain LiCl in the lithium salt. The kind of the lithium salt to be used may be one kind, or may be two kinds or more. A concentration of lithium ions in the electrolytic solution is not less than 3 M, for example. The concentration of lithium ions in the electrolytic solution is made not less than 6 M, and thereby ions of the solute and water molecules solvate to cause free water molecules to be decreased. By this means, this is preferable because the electrolysis reaction of the aqueous solvent at the negative electrode is suppressed, and the generation of hydrogen from the negative electrode can be reduced. A more preferable concentration of the lithium ions is 6 M-10 M.

It is preferable that as an anion series in the electrolytic solution in which the above-described lithium salt has been dissolved, at least one kind selected from a group consisting of a chrome ion ($Cl^-$), a hydroxide ion ($OH^-$), a sulfuric acid ion ($SO_4^{2-}$), and a nitric acid ion ($NO_3^-$) exists.

Then, 5 vol. % of at least one kind of the organic solvent with a relative permittivity of not more than 42 is mixed, for example, into the electrolytic solution to be prepared by dissolving the electrolyte salt into the aqueous solvent. And, the electrolytic solution is prepared so that a relative permittivity thereof converted according to a volume fraction becomes not more than 78.50. Here, as the reason to use the organic solvent with a relative permittivity of not more than 42, it is thought that an action to suppress water decomposition is generated by blocking contact between an electrode interface and water, and a preferable range thereof is not more than 39. In addition, the electrolytic solution is prepared so that the relative permittivity thereof converted according to a volume fraction becomes not more than 78.50, and thereby an effect to suppress water decomposition is remarkably expressed, and a preferable range thereof is not more than 77.93.

The relative permittivity of the above-described aqueous solvent is a value converted from a solvent component containing not less than 1 vol. % as a volume fraction.

A ratio of the organic solvent in the electrolytic solution is preferably smaller than 50 vol. %. However, when the organic solvent is composed of two or more kinds of organic solvents, a sum of the vol. % of the organic solvents is preferably smaller than 50 vol. %. This is because when a ratio of the organic solvent is more than 50 vol. %, firing might be caused at a high temperature.

Organic solvents with a relative permittivity of not more than 42 are described below, and a solvent miscible with water is used as the organic solvent.

Alcohols, such as methanol, ethanol, butanol, isobutanol, isopropyl alcohol, normal propyl alcohol, tert-butanol, secondary butyl alcohol, 1,3-butanediol, 1,4-butanediol, 2-ethyl-1-hexanol, benzyl alcohol.

Ketones, such as acetone, methyl ethyl ketone, methyl isobutyl ketone, diisobutyl ketone, cychrohexanone, diacetone alcohol.

Esters, such as ethyl acetate, methyl acetate, butyl acetate, sec-butyl acetate, methoxybutyl acetate, amyl acetate, normal propyl acetate, isopropyl acetate, ethyl lactate, methyl lactate, butyl acetate, 3-ethoxypropionic acid ethyl.

Ethers, such as isopropyl ether, methyl cellosolve, ethyl cellosolve, butyl cellosolve, 1,4-dioxane, tetrahydrofuran, methyl tert-butyl ether.

Glycols, such as ethylene glycol, diethylene glycol, triethylene glycol, propylene glycol, ethylene glycol monoethyl ether acetate, propylene glycol monomethyl ether acetate, butyl carbitol acetate, ethyl carbitol acetate.

Glycol ethers, such as methyl carbitol, ethyl carbitol, butyl carbitol, methyl triglycol, propylene glycol monomethyl ether, propylene glycol monobutyl ether, 3-methoxy-3-methyl-1-butanol, hexyl diglycol, propylene glycol monomethyl ether propionate, dipropylene glycol methyl ether.

Glymes, such as monoglyme, diglyme, ethyl glyme, ethyl diglyme, triglyme, butyl diglyme, tetraglyme, dipropylene glycol dimethyl ether.

Non-protonic polar solvents, such as dimethyl formamide, dimethyl acetoamide, hexamethyl phosphoric triamide, acetonitrile, propionitrile, butyronitrile, isobutyronitrile, valeronitrile, isovaleronitrile, lauronitrile, 2-methylbutylnitrile, trimethyl acetonitrile, hexanenitrile, cyclopentane carbonitrile, cyclohexane carbonitrile, acrylonitrile, methacrylonitrile, crotononitrile, N-ethyl-2-pyrolidone, γ-butyrolactam, Cyclic carboxylic acid esters, such as gamma-butyrolactone, gamma-valerolactone, gamma-caprolactone, epsilon-caprolactone.

Chain carbonate compounds, such as dimethyl carbonate, diethyl carbonate, di-n-propyl carbonate, diisopropyl carbonate, n-propylisopropyl carbonate, ethyl methyl carbonate, methyl-n-propyl carbonate.

Amine series solvents, such as methylamine, dimethylamine, trimethylamine, ethylamine, diethylamine, triethylamine, ethylenediamine, triethanolamine, N,N-diisopropylethylamine.

One kind of the organic solvents with a relative permittivity of not more than 42 may be used solely, or two or more kinds thereof may be used in combination. In addition, an organic solvent with a relative permittivity of not more than 42 and an organic solvent with a relative permittivity of more than 42 may be used in combination. An example of the organic solvent with a relative permittivity of more than 42 is DMSO and cyclic carbonates, for example. As an example of the more preferable organic solvent with a relative permittivity of not more than 42, alcohols, aprotic polar solvent can be listed.

The relative permittivity of the aqueous solvent can be obtained by adding the values calculated from volume fractions of relative permittivities of the respective mixed solvents. Structure identification is performed to the organic solvents mixed in the electrolytic solution by a structure analysis method such as FT/IR (Fourier Transform Infrared Spectroscopy), and the electrolytic solution is fractionated, to obtain the volume fractions thereof, or the electrolytic solution and a known solvent are mixed with each other at equivalent amounts, and the volume fractions thereof can be obtained by a ratio of the peak areas in the gas chromatograph of the mixed solution analyzed by a gas chromatography.

2) Negative electrode The negative electrode has a negative electrode collector and a negative electrode active material layer which is carried on one surface or the both surfaces of the negative electrode collector, and which contains an active material, a conductive agent and a binding agent.

The negative electrode collector is preferably an aluminum foil, or a foil of an aluminum alloy containing at least one element selected from Mg, Ti, Zn, Mn, Fe, Cu and Si. The aluminum alloy may contain one kind of these elements, or may contain two or more kinds thereof. The negative electrode collector may be of another form such as a porous body or a mesh.

The negative electrode active material layer is arranged on at least one surface of the negative electrode collector. For example, the negative electrode active material layer may be arranged on one surface of the negative electrode collector, and the negative electrode active material layers may be arranged on one surface and the rear surface of the negative electrode collector.

As the negative electrode active material, a titanium-containing oxide, such as a titanium oxide, a lithium-titanium oxide, a niobium-titanium oxide, a sodium-niobium-titanium oxide may be used. A Li storage potential of the titanium-containing oxide is preferably not less than 1 V (vs. Li/Li$^+$) and no more than 3 V (vs. Li/Li$^+$). The negative electrode active material may contain one kind or two or more kinds of these titanium-containing oxides.

The titanium oxide contains a titanium oxide of a monoclinic structure, a titanium oxide of a rutile structure, a titanium oxide of an anatase structure, for example. Regarding the titanium oxides of the respective crystal structures, a composition thereof before charging, and a composition thereof after charging may be expressed as $TiO_2$, $Li_xTiO_2$ (x is 0≤x≤1). In addition, a structure of the titanium oxide of the monoclinic structure before charging may be expressed as $TiO_2$ (B).

The lithium-titanium oxide contains a lithium-titanium oxide of a spinel structure (for example, general formula $Li_{4+x}Ti_5O_{12}$ (x is −1≤x≤3)), a lithium-titanium oxide of a ramsdellite structure (for example, $Li_{2+x}Ti_3O_7$ (−1≤x≤3), $Li_{1+x}Ti_2O_4$ (0≤x≤1), (0≤x≤1), $Li_{1.1+x}Ti_{1.8}O_4$ (0≤x≤1), $Li_xTiO_2$ (0<x≤1)) and so on, for example. In addition, the lithium-titanium oxide may be a lithium-titanium composite oxide in which a hetero element is introduced.

The niobium-titanium oxide contains an oxide expressed by $Li_aTiM_bNb_{2\mp\beta}O_{7\mp\sigma}$ (0≤a≤5, 0≤b≤0.3, 0≤β≤0.3, 0≤σ≤0.3, M is at least one element selected from a group consisting of Fe, V, Mo and Ta).

The sodium-niobium-titanium oxide contains a monoclinic type Na-containing niobium-titanium composite oxide expressed by a general formula $Li_{2+v}Na_{2-w}M1_xTi_{6-y-z'}Nb_yM2_xO_{14+\delta}$ (0≤v≤4, 0≤w<2, 0≤x≤2, 0≤y<6, 0≤z<3, −0.5≤δ≤0.5, M1 contains at least one selected from Cs, K, Sr, Ba, Ca, and M2 contains at least one selected from Zr, Sn, V, Ta, Mo, W, Fe, Co, Mn, Al).

In a preferable compound as the negative electrode active material, a titanium oxide of an anatase structure, a titanium oxide of a monoclinic structure, a lithium-titanium oxide of a spinel structure are contained. Because in each of these compounds, the Li storage potential is within a range of not less than 1.4 V (vs. Li/Li$^+$) and not more than 2 V (vs. Li/Li$^+$), it is possible to obtain a high electromotive force by combining each of these compounds with an lithium-manganese oxide as a positive electrode active material, for example.

The negative electrode active material is contained in the negative electrode in a form of particles, for example. The negative electrode active material particle may be a single primary particle, a secondary particle that is an aggregate of the primary particles, or a mixture of the single primary particle and the secondary particle, for example. The shape of the particle is not particularly limited, and may be formed of a sphere shape, an elliptical shape, a flat shape, a fibrous form.

An average particle diameter (diameter) of the secondary particles of the negative electrode active material is preferably not less than 3 μm, and is more preferably not less than 5 μm and not more than 20 μm. If it is within this range, since the surface area of the active material is small, it is possible to enhance an effect to suppress generation of hydrogen.

The negative electrode active material containing the secondary particles having the average particle diameter of not less than 3 μm may be obtained by a method described below, for example. To begin with, an active material precursor having an average particle diameter of not more than 1 μm is manufactured, from raw material of the active material. Then, a baking treatment is performed to the active material precursor, and then grinding a treatment is performed to it using a grinder such as a ball mill and a jet mill. Next, in the baking treatment, the active material precursor is made to aggregate, and is made to grow into secondary particles having a large particle diameter.

It is preferable that an average particle diameter of the primary particles of the negative electrode active material is made not more than 1 μm. By this means, diffusion distances of the Li ions inside the active material become short, and a specific surface area becomes large. For the reason, an excellent high input performance (rapid charging) can be obtained. On the other hand, if an average particle diameter thereof is small, aggregation of the particles easily occurs, and consumption of Li ions increases due to formation of SEI on the negative electrode, and thereby the depletion of the ion species ionized from the electrolyte salt at the positive electrode might be caused. Accordingly, a lower limit value of the average particle diameter of the primary particles of the negative electrode active material is preferably 0.001 μm, and a more preferable average particle diameter is not less than 0.1 μm, and not more than 0.8 μm.

The negative electrode active material has a specific surface area by a BET method by N2 adsorption is within a range of not less than 3 m²/g and not more than 200 m²/g, for example. By this means, the affinity of the negative electrode with the electrolytic solution can be further increased. a specific surface area of the negative electrode is more preferably within a range of not less than 3 m²/g and not more than 50 m²/g. The negative electrode active material may be a porous layer which is carried on the collector and contains the negative electrode active material, the conductive agent and the binding agent. When the specific surface area is less than 3 m²/g, the aggregation of the particles conspicuously occurs, and thereby the affinity of the negative electrode with the aqueous electrolytic solution is decreased. As a result, as the interface resistance of the negative electrode increases, the output characteristic and the charge/discharge cycle characteristic decrease. On the other hand, if the specific surface area exceeds 50 m²/g, the distribution of the ion species ionized from the aqueous electrolyte salt is biased to the negative electrode, to cause the shortage of the ion species ionized from the aqueous electrolyte salt at the positive electrode to be insufficient, and thereby improvement of the output characteristic and the charge/discharge cycle characteristic cannot be achieved.

A porosity of the negative electrode (except the collector) preferable is preferably in a range of 20%-50%. By this means, it is possible to obtain the negative electrode which is excellent in the affinity of the negative electrode and the electrolytic solution and is of a high density. A more preferable range of the porosity is 25%-40%.

The conductive agent is blended as needed in order to enhance the collecting performance, and to suppress the contact resistance between the active material and the collector. In an example of the conductive agent, a carbonaceous material such as acetylene black, Ketjen black, graphite and coke is contained. The conductive agent may be of one kind, or two or more kinds of the conductive agents may be used by mixing them.

The binding agent has an action to bind the active material, the conductive agent and the collector. As the binding agent, at least one selected from a group consisting of polytetrafluoroethylene (PTFE), polyvinylidene fluoride (PVdF), a cellulosic member such as sodium carboxymethyl cellulose (CMC), fluororubber, styrene-butadiene rubber, acrylic resin or its copolymer, polyacrylic acid and polyacrylonitrile may be used, but the binding agent is not limited to these. The binding agent may be of one kind, or two or more kinds of the binding agents may be used by mixing them.

A blending ratio of the negative electrode active material, the conductive agent and the binding agent in the negative electrode active material layer is preferably that a ratio of the negative electrode active material is not less than 70 wt. % and not more than 95 wt. %, a ratio of the negative electrode conductive agent is not less than 3 wt. % and not more than 20 wt. %, and a ratio of the binding agent is not less than 2 wt. % and not more than 10 wt. %. When the blending ratio of the conductive agent is not less than 3 wt. %, the conductivity of the negative electrode can be made excellent, and when it is not more than 20 wt. %, the decomposition of the electrolytic solution on the surface of the conductive agent can be reduced. When the blending ratio of the binding agent is not less than 2 wt. %, a sufficient electrode strength can be obtained, and when it is not less than 10 wt. %, the insulating portion of the electrode can be reduced.

The negative electrode can be manufactured by the following method, for example. To begin with, the negative electrode active material, the conductive agent and the binding agent are suspended in a proper solvent, to prepare slurry. Next, this slurry is applied to one surface or the both surfaces of the negative electrode collector. Here, as the negative electrode collector, the negative electrode collector with a coated layer which has been previously formed by the above-described method is used. The coated film on the negative electrode collector is dried, to prepare the negative electrode active material layer. Then the negative electrode collector and the negative electrode active material layer formed thereon are subjected to pressing. As the negative electrode active material layer, one obtained by forming the negative electrode active material, the conductive agent and the binding agent in a pellet shape may be used.

3) Positive electrode The positive electrode has a positive electrode collector and a positive electrode active material layer which is carried on one surface or the both surfaces of the positive electrode collector, and which contains an active material, a conductive agent and a binding agent.

The positive electrode collector consists of metal such as stainless steel, Al and Ti. The positive electrode collector is in a form of a foil, a porous body, or a mesh. In order to prevent corrosion of the collector by the reaction of the collector and the electrolytic solution, the surface of the collector may be coated with a hetero element. The positive electrode collector is preferably one such as a Ti foil which is excellent in corrosion resistance and oxidation resistance. In addition, when $Li_2SO_4$ is used as the lithium salt to be used in the above-described electrolytic solution, since the corrosion does not make progress, Al may be used as the positive electrode collector.

As the positive electrode active material, one capable of storing and releasing lithium may be used. The positive electrode may contain one kind of the positive electrode active material, or may contain two or more kinds of the positive electrode active materials. In an example of the positive electrode active material, a lithium-manganese composite oxide, a lithium-nickel composite oxide, a lithium-cobalt-aluminum composite oxide, a lithium-nickel-cobalt-manganese composite oxide, a spinel type lithium-manganese-nickel composite oxide, a lithium-manganese-cobalt composite oxide, a lithium-iron composite oxide, lithium ironfluorosulfate, a lithium phosphate compound of an olivine crystal structure (for example, $Li_xFePO_4$ ($0<x\leq1$), $Li_xMnPO_4$ ($0<x\leq1$) and so on are contained. The phosphate compound of an olivine crystal structure is excellent in thermal stability.

Examples of the positive electrode active material in which a high positive electrode potential is obtained will be described below. A lithium-manganese composite oxide such as $Li_xMn_2O_4$ ($0<x\leq1$), $Li_xMnO_2$ ($0<x\leq1$) of a spinel structure, a lithium-nickel-aluminum composite oxide such as $Li_xNi_{1-y}Al_yO_2$ ($0<x\leq1$, $0<y<1$), a lithium-cobalt composite oxide such as $Li_xCoO_2$ ($0<x\leq1$), a lithium-nickel-cobalt-manganese composite oxide such as $Li_xNi_{1-y-z}Co_yMn_xO_2$ ($0<x\leq1$, $0<y<1$, $0\leq z<1$), a lithium-manganese-cobalt composite oxide such as $Li_xMn_yCo_{1-y}O_2$ ($0<x\leq1$, $0<y<1$), a spinel type lithium-manganese-nickel composite oxide such as $Li_xMn_{i-y}Ni_yO_4$ ($0<x\leq1$, $0<y<2$), a lithium phosphate compound having an olivine structure such as $Li_xFePO_4$ ($0<x\leq1$), $Li_xFe_{1-y}Mn_yPO_4$ ($0<x\leq1$, $0\leq y\leq1$), $Li_xCoPO_4$ ($0<x\leq1$), and lithium ironfluorosulfate such as $Li_xFeSO_4F$ ($0<x\leq1$) are listed.

The positive electrode active material is preferably at least one selected from a group consisting of a lithium-cobalt composite oxide, a lithium-manganese composite oxide and a lithium phosphate compound having an olivine structure. These active materials are preferable, because an operating potential is not less than 0.2 V (vs. Li/Li$^+$) and not more than 0.8 V (vs. Li/Li$^+$), the operating potential is high, and since each of these active materials has the operation potential in the vicinity of an equilibrium potential in which oxygen is to be generated, the charge/discharge cycle can be stably performed. These positive electrode active materials are used in combination with the negative electrode active material such as lithium titanate of a spinel structure and titanium oxide of an anatase type, and thereby a high battery voltage can be obtained.

The positive electrode active material is contained in the positive electrode in a form of particles, for example. The positive electrode active material particle may be a single primary particle, a secondary particle that is an aggregate of primary particles, or a mixture of the single primary particle and the secondary particle, for example. The shape of the particle is not particularly limited, and may be formed of a sphere shape, an elliptical shape, a flat shape, a fibrous form.

The particle of the positive electrode active material may be a single primary particle, a secondary particle that is an aggregate of the primary particles, or one containing both of the single primary particle and the secondary particle. An average particle diameter (diameter) of the primary particles of the positive electrode active material is preferably not more than 10 μm, and is more preferably 0.1 μm-5 μm. An average particle diameter (diameter) of the secondary particles of the positive electrode active material is preferably not more than 100 μm, and is more preferably 10 μm-50 μm.

The conductive agent is blended as needed in order to enhance the collecting performance, and to suppress the contact resistance between the active material and the collector. In an example of the conductive agent, a carbonaceous material such as acetylene black, Ketjen black, graphite and coke is contained. The conductive agent may be of one kind, or two or more kinds of the conductive agents may be used by mixing them.

As the binding agent, polytetrafluoroethylene (PTFE), polyvinylidene fluoride (PVdF), fluororubber, ethylenebutadiene rubber, polypropylene (PP), polyethylene (PE), carboxymethyl cellulose (CMC), polymide (PI), polyacryl imide (PAI) and so on are listed. The binding agent may be of one kind, or two or more kinds of the binding agents may be used by mixing them.

A blending ratio of the positive electrode active material, the conductive agent and the binding agent in the positive electrode active material layer is preferably that a ratio of the positive electrode active material is not less than 70 wt. % and not more than 95 wt. %, a ratio of the positive electrode conductive agent is not less than 3 wt. % and not more than 20 wt. %, and a ratio of the binding agent is not less than 2 wt. % and not more than 10 wt. %. When the blending ratio of the conductive agent is not less than 3 wt. %, the conductivity of the positive electrode can be made excellent, and when it is not more than 20 wt. %, the decomposition of the electrolytic solution on the surface of the conductive agent can be reduced. When the blending ratio of the binding agent is not less than 2 wt. %, a sufficient electrode strength can be obtained, and when it is not less than 10 wt. %, the insulating portion of the electrode can be reduced.

The positive electrode can be manufactured by the following method, for example. To begin with, the positive electrode active material, the conductive agent and the binding agent are suspended in a proper solvent to prepare slurry. Next, this slurry is applied to one surface or the both surfaces of the positive electrode collector. The coated film on the positive electrode collector is dried, to prepare the positive electrode active material layer. Then the positive electrode collector and the positive electrode active material layer formed thereon are subjected to pressing. As the positive electrode active material layer, one obtained by forming the positive electrode active material, the conductive agent and the binding agent in a pellet shape may be used.

4) Separator The separator may be arranged between the positive electrode and the negative electrode. In an example of the separator, a nonwoven fabric, a film, paper and so on are contained. In a constituent material of the separator, polyolefin such as polyethylene and polypropylene, and cellulose are contained. As an example of the preferable separator, a nonwoven fabric containing cellulose fiber, a porous film containing polyolefin fiber can be listed.

A porosity of the separator is preferably not less than 60%. In addition, a fiber diameter thereof is preferably not more than 10 μm. The fiber diameter is made to be not more than 10 μm, and thereby the affinity of the separator with the electrolytic solution is improved, to cause the battery resistance to be small. A more preferable range of the fiber diameter is not more than 3 μm. A nonwoven fabric containing cellulose fiber with a porosity of not less than 60% has good impregnation property of the electrolytic solution, and when the separator like is used, the secondary battery can exert high output performance at a low temperature to a high temperature. In addition, in the case of the long-term charge preservation, float charging, overcharge of the secondary battery, the separator does not react with the negative electrode, and thereby the short-circuiting between the negative electrode and the positive electrode due to dendrite precipitation of the lithium metal is not generated. A porosity of the separator is more preferably 62%-80%. In addition, a solid electrolyte may be used as the separator. As the solid electrolyte, oxides such as LATP ($Li_{1+x}Al_xTi_{2-x}(PO_4)_3$) having a NASICON type, amorphous LIPON ($Li_{2.9}PO_{3.3}N_{0.46}$), garnet type LLZ ($Li_7La_3Zr_2O_{12}$) are preferable.

Preferably, the separator has a thickness of not less than 20 pin and not more than 100 μm, and a density of 0.2 g/cm$^3$ and not more than 0.9 g/cm$^3$. If the thickness and density of the separator are within these ranges, it is possible to take a balance between the mechanical strength and the reduction of the battery resistance, and thereby it is possible to provide a secondary battery having a high output in which the internal short-circuiting is suppressed. In addition, in the high temperature environment, the separator has small heat shrink, and good high temperature storage performance can be exerted.

5) Container As the container in which the positive electrode, the negative electrode and the electrolytic solution are to be housed, a metal container, a laminated film container, a resin container made of polyethylene, polypropylene or the like may be used.

As the metal container, a metal may which is made of nickel, iron, stainless steel or the like and is of a square or cylindrical shape may be used.

A sheet thickness of each of the resin container and the metal container is preferably within a range of not less than 0.05 mm and not more than 1 mm. More preferably, the sheet thickness is not more than 0.5 mm, and further preferably, it is not more than 0.3 mm.

As the laminated film, a multilayer film and so on having a metal layer coated with a resin layer can be listed, for example. In an example of the metal layer, a stainless steel foil, an aluminum foil, an aluminum alloy foil are contained. A polymer such as polypropylene (PP), polyethylene (PE), nylon, polyethylene terephthalate (PET) can be used for the resin layer. A thickness of the laminated film is preferably within a range of not less than 0.01 mm and not more than 0.5 mm. The thickness of the laminated film is more preferably not more than 0.2 mm.

The secondary battery according to the present embodiment may be used in various shapes, such as a square type, a cylindrical type, a flat type, a thin type, a coin type. Further, it may be a secondary battery having a bipolar structure. By this means, there is a merit that a plurality of series-connected cells can be manufactured in the form of one cell.

Hereinafter, an example of a lithium secondary battery 32 according to an embodiment will be described with reference to FIG. 1-FIG. 5.

Figure 2:
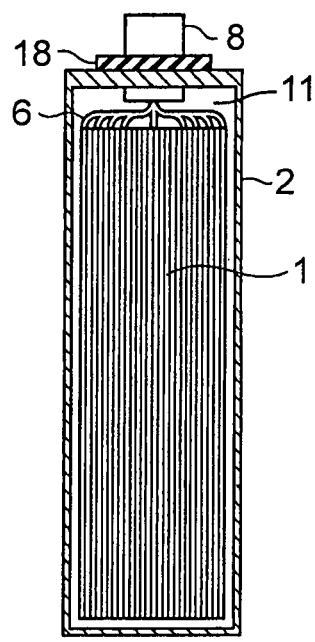
FIG. 2 is a sectional view of the secondary battery shown in FIG. 1 along a II-II line.

FIG. 1 is a sectional view schematically showing an example of a square secondary battery 32 according to an embodiment. FIG. 2 is a sectional view of the square secondary battery 32 shown in FIG. 1 along a II-II line.

In the secondary battery 32, an electrode group 1 and an electrolytic solution 11 are housed in a metal container 2.

The electrode group 1 is provided with positive electrodes 3, negative electrodes 4 and separators 5A each provided between the positive electrode 3 and the negative electrode 4. For example, the electrode group 1 has a structure that the positive electrode 3, the separator 5A, the negative electrode 4, the separator 5A are laminated in this order. The electrode group 1 is immersed in the electrolytic solution 11. In addition, the electrode group 1 may be formed of a structure that the positive electrode 3, the negative electrode 4 and the separator 5A interposed therebetween are wound in a spiral shape, so as to form a flat shape. In any case of the structures of the electrode group 1, it is desirable to use a structure that a separator 5B is arranged at the outermost layer of the electrode group 1, so as to avoid contacting of the electrode and the container 2.

The secondary battery 32 shown in FIG. 1 is provided with a positive electrode lead 8 (positive electrode outer terminal) and a negative electrode lead 9 (negative electrode outer terminal) on the outer upper surface of the container 2. In addition, the secondary battery 32 is provided with a positive electrode tab 6 (positive electrode inner terminal) with an end connected to the positive electrode lead 8, and a negative electrode tab 7 (negative electrode inner terminal) with an end connected to the negative electrode lead 9, at the upper portion inside the container 2. The positive electrode tab 6 (positive electrode inner terminal) and the positive electrode lead 8 (positive electrode outer terminal) composes a positive electrode terminal. The negative electrode tab 7 (negative electrode inner terminal) and the negative electrode lead 9 (negative electrode outer terminal) composes a negative electrode terminal.

As shown in FIG. 2, another end of the positive electrode tab 6 is formed in a strip shape, and is electrically connected to a plurality of places of the end portions of the positive electrodes 3 located at the upper side end surface of the electrode group 1. In addition, though not shown in the drawing, similarly, another end of the negative electrode tab 7 is formed in a strip shape, and is electrically connected to a plurality of places of the end portions of the negative electrodes 4 located at the upper side end surface of the electrode group 1.

In FIG. 1, a metal sealing plate 10 is fixed to an opening portion of the metal container 2 by welding or the like. The positive electrode lead 8 and the negative electrode lead 9 are respectively drawn out to the outside through takeout holes provided in the sealing plate 10. At the inner circumferential surfaces of the respective takeout holes of the sealing plate 10, a positive electrode gasket 18 and a negative electrode gasket 19 are arranged, so as to avoid short-circuiting caused by the contact with the positive electrode lead 8 and the negative electrode lead 9. The positive electrode gasket 18 and the negative electrode gasket 19 are arranged, and thereby airtightness of the square secondary battery 32 can be maintained.

A control valve 22 (safety valve) is arranged on the sealing plate 10. When an inner pressure in the battery cell due to the gas generated by the electrolysis of the aqueous solvent is increased, the generated gas can be diffused to the outside from the control valve 22. As the control valve 22, a valve of a return type may be used which operates when the inner pressure becomes higher than a setting value, and functions as a sealing plug when the inner pressure is decreased, for example. Or, a control valve of a non-return type may be used which does not restore a function of the sealing plug after having operated once. In FIG. 1, the control valve 22 is arranged at the center of the sealing plate 10, but the position of the control valve 22 may be an end portion of the sealing plate 10. The control valve 22 may be omitted.

In addition, a liquid injection port 23 is provided in the sealing plate 10. The electrolytic solution 11 can be injected through the liquid injection port 23. After the electrolytic solution 11 has been injected, the liquid injection port 23 is blocked by a sealing plug 24. The liquid injection port 23 and the sealing plug 24 may be omitted.

Figure 3:
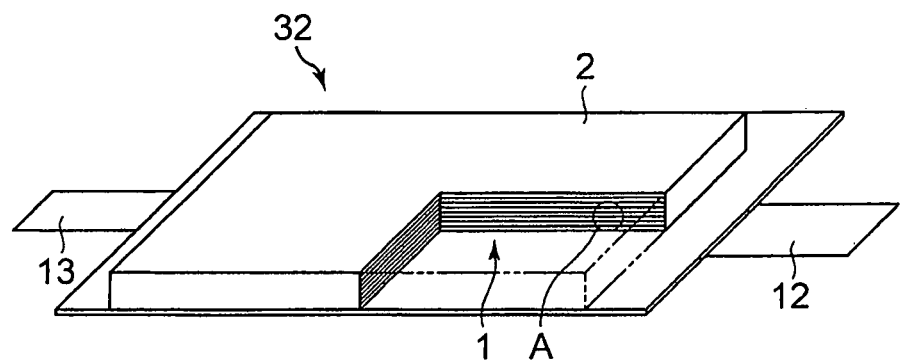
FIG. 3 is a partially cutaway perspective view schematically showing another example of the secondary battery according to the first embodiment.
Figure 4:
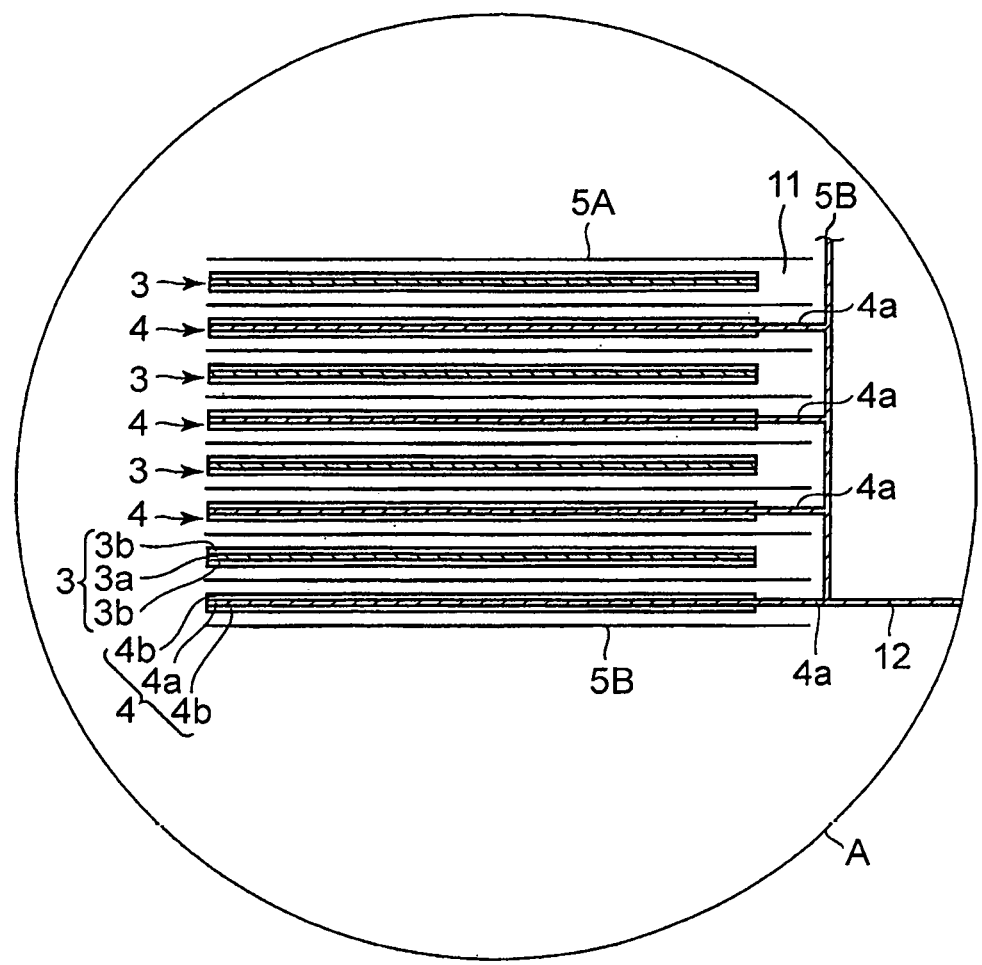
FIG. 4 is an enlarged sectional view of the A portion of FIG. 3.

FIG. 3 is a partially cutaway perspective view schematically showing another example of the secondary battery 32 according the first embodiment. FIG. 4 is an enlarged sectional view of the A portion of FIG. 3. FIG. 3 and FIG. 4 show an example of the secondary battery 32 using an exterior member made of a laminated film as a container.

The laminated electrode group 1 along with the electrolytic solution 11 are housed in the bag-like container 2 made of a laminated film in which a metal layer is interposed between two resin films. The laminated electrode group 1 has a structure that a plurality of the positive electrodes 3 and a plurality of the negative electrodes 4 are alternately laminated, while a plurality of the separators 5A are interposed therebetween, and the inside the air holes of the separators 5A and the inside of the container are filled with the electrolytic solution 11. Each of the positive electrodes 3 is provided with a collector 3a and positive electrode active material layers 3b formed on the both surfaces of the collector 3a. Each of the negative electrodes 4 is provided with a collector 4a and negative electrode active material layers 4b formed on the both surfaces of the collector 4a. One side of the collector 4a of each of the negative electrodes 4 projects from the positive electrode 3. The collectors 4a projecting in the right side direction in the drawing are electrically connected to a belt-like negative electrode terminal 12. In addition, the negative electrode terminal 12 is electrically connected to the negative electrode tab 7. A tip of the belt-like negative electrode terminal 12 is drawn out to the outside from a side of the container 2. In addition, though not shown in the drawing, one side located at the opposite side to the projecting side of the collector 4a of the collector 3a of each of the positive electrodes 3 projects from the negative electrodes 4. The collectors 3a projecting from the negative electrodes 4 in the left side direction in the drawing are electrically connected to a belt-like positive electrode terminal 13 (in FIG. 4, the illustration of the positive electrode terminal 13 is omitted for simplification). In addition, the positive electrode terminal 13 is electrically connected to the positive electrode tab 6. A tip of the belt-like positive electrode terminal 13 is located at the opposite side to the negative electrode terminal 12 and is drawn out to the outside from a side of the container 2.

In the secondary battery 32 shown in FIG. 3 to FIG. 4, a safety valve for discharging hydrogen gas generated in the container 2 to the outside may be provided in the same manner as FIG. 1. As the safety valve, any of a valve of a return type which operates when the inner pressure becomes higher than a setting value, and functions as a sealing plug when the inner pressure is decreased, and a valve of a non-return type which does not restore a function of the sealing plug after having operated once may be used. In addition, the secondary batteries 32 shown in FIG. 1 to FIG. 4 are of a tightly-sealed type, but when a circulation system to return the hydrogen gas to water is provided, the secondary battery 32 of an open system can be used.

The secondary batteries 32 according to the embodiment may compose an assembled battery.

As an example of the assembled battery, one including a plurality of unit cells which are electrically connected in series, in parallel, or in combination of a series connection and a parallel connection, as a constituent unit, a unit composed of a plurality of unit cells which are electrically connected in series, one including a unit composed of a plurality of unit cells which are electrically connected in parallel, or a unit composed of a plurality of unit cells which are electrically connected in combination of a series connection and a parallel connection can be listed.

The assembled battery may be housed in a chassis. As the chassis, a metal can made of an aluminum alloy, iron, stainless steel or the like, a plastic container or the like may be used. In addition, a wall thickness of the container is preferably not less than 0.5 mm.

In an example of a form for electrically connecting a plurality of the secondary batteries 32 in series or in parallel, one in which a plurality of the secondary batteries 32 each having a container are electrically connected in series or in parallel, and one in which a plurality of the electrode groups each being housed in a mutual chassis are electrically connected in series or in parallel, are contained. A specific example of the former is to connect the positive electrode terminals and the negative electrode terminals of a plurality of the secondary batteries 32 with a bus bar made of metal (for example, aluminum, nickel, copper). A specific example of the latter is to house a plurality of the electrode groups in one chassis in a state to be electrochemically insulated by partition walls, and to electrically connect these electrode groups in series. The batteries of the number (within a range of 5-7) are electrically connected in series, for example, and thereby an assembled battery having a good voltage interchangeability with a lead storage battery can be obtained. In order to enhance the voltage interchangeability with a lead storage battery, a configuration in which five or six unit cells are connected in series is preferable.

An example of the assembled battery will be described with reference to FIG. 5.

Figure 5:
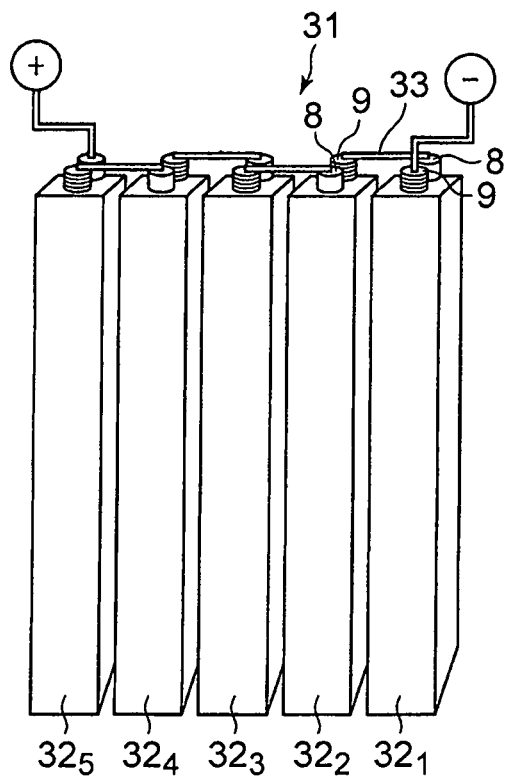
FIG. 5 is a perspective view schematically showing an example of an assembled battery according to the first embodiment.

FIG. 5 is a perspective view schematically showing an example of an assembled battery which, using the secondary battery according to the embodiment as a unit cell, is provided with a plurality of the unit cells. An assembled battery 31 is provided with a plurality of square secondary batteries (the battery which has been described in FIG. 1 and FIG. 2, for example) $32_1$-$32_5$. The positive electrode lead 8 of the battery $32_1$ and the negative electrode lead 9 of the battery $32_2$ located next to it are electrically connected by a lead 33. Further, the positive electrode lead 8 of the battery $32_2$ and the negative electrode lead 9 of the battery $32_3$ located next to it are electrically connected by the lead 33. The batteries $32_1$-$32_5$ are connected in series in this manner.

In addition, when five secondary batteries according to the embodiment are connected in series, excellent interchangeability with a lead storage battery can be obtained. Accordingly, the assembled battery in which the five secondary batteries 32 are connected in series may be used as an alternative power source to a lead storage battery.

The electrolytic solution of the secondary battery 32 according to the first embodiment contains water, the electrolyte salt, the organic solvent with a relative permittivity of not more than 42. That is, the electrolytic solution is an electrolytic solution in which a definite amount of the organic solvent is mixed. At this time, at least one kind of the organic solvent with a relative permittivity of not more than 42 is used, and the electrolytic solution with a relative permittivity converted according to a volume fraction of not more than 78.50 is used. The electrolytic solution with a specified relative permittivity like this is used, and thereby an action to suppress the electrolysis of water at the surface of the negative electrode at the time of charging is exhibited. The organic solvent is mixed into the electrolytic solution, to cause water molecules in the system to be decreased, and the conduction of the protons generated from the linkage of the hydrogen bonds of water is also decreased, and thereby it is assumed that the electrolysis of water is suppressed, and as a result, the life performance thereof can be increased. In addition, the above-described electrolytic solution is used, and thereby it is possible to provide a secondary battery which does not fire and has high safety.

Second Embodiment

According to a second embodiment, a battery pack is provided. This battery pack is provided with the secondary batteries according to the first embodiment, and a circuit section for controlling charge/discharge of the secondary batteries.

The battery pack may be provided with one or a plurality of the above-described secondary batteries (unit cells) according to the first embodiment. A plurality of the secondary batteries to be contained in the battery pack may be electrically connected in series, in parallel, or in combination of a series connection and a parallel connection. In addition, when an assembled battery is composed of a plurality of the secondary batteries, the assembled battery which has been described in the first embodiment may be used.

The battery pack may be further provided with a protection circuit. The protection circuit is used for controlling charge/discharge of the secondary battery. Or, a circuit contained in an apparatus (an electronic device, a car or the like, for example) which uses the battery pack as a power source may be as the protection circuit of the battery pack.

In addition, the battery pack may be further provided with an outer terminal for energization. The outer terminal for energization is used for outputting a current from the secondary battery to the outside, and/or for inputting a current into the secondary battery. In other words, at the time of using the battery pack as a power source, a current is supplied to the outside through the outer terminal for energization. In addition, at the time of charging the battery pack, a charging current (including a regenerative energy of a power of a car or the like) may be supplied to the battery pack through the outer terminal for energization.

The circuit section may be connected to the secondary battery, before a time point when the battery pack is mounted on a vehicle such as a car or an electronic device. Or the circuit section provided in a vehicle such as a car may be connected to the secondary battery provided in the battery pack. The battery pack according to the embodiment contains a battery pack of any form.

Figure 6:
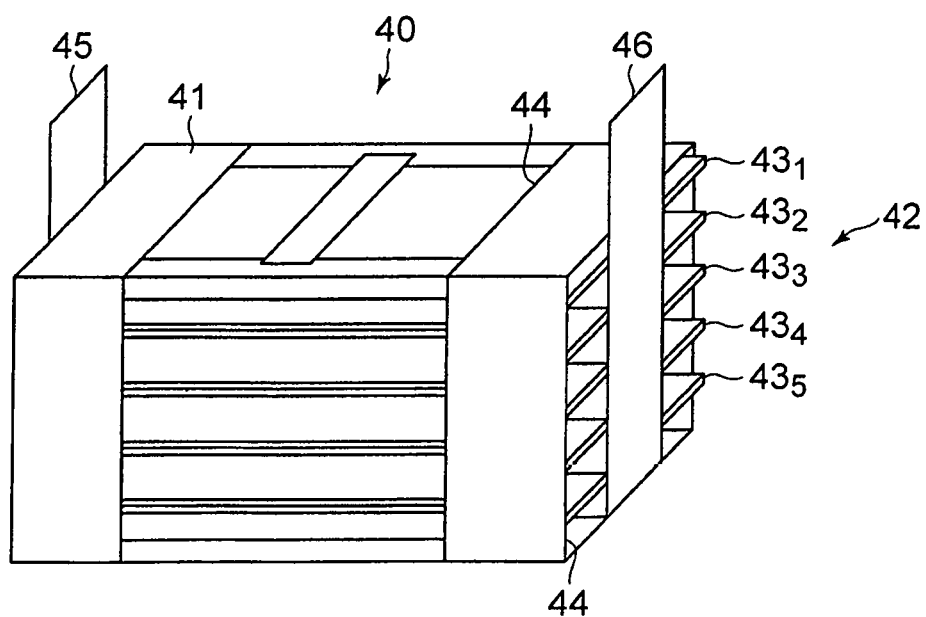
FIG. 6 is a perspective view schematically showing an example of a battery pack according to a second embodiment.

An example of the battery pack according to the embodiment will be described with reference to FIG. 6-FIG. 8. FIG. 6 is a perspective view showing an example of the battery pack according to the embodiment.

A battery pack 40 is provided with an assembled battery composed of the secondary batteries shown in FIG. 3 and FIG. 4. The battery pack 40 includes a chassis 41 and an assembled battery 42 housed in the chassis 41. The assembled battery 42 is composed of a plurality (five, for example) of secondary batteries $43_1$-$43_5$ which are electrically connected in series. The secondary batteries $43_1$-$43_5$ are laminated in a thickness direction. The chassis 41 has opening portions 44 in the upper portion and four side surfaces thereof. The side surfaces from which the positive and negative electrode terminals 12, 13 project are exposed in the opening portions of the chassis 41. A positive electrode output terminal 45 of the assembled battery 42 is in a belt-like shape, and one end thereof is electrically connected to at least one positive electrode terminal 12 of the secondary batteries $43_1$-$43_5$, and the other end projects from the opening portion 44 of the chassis 41, and projects from the upper portion of the chassis 41. On the other hand, a negative electrode output terminal 46 of the assembled battery 42 is in a belt-like shape, and one end thereof is electrically connected to at least one negative electrode terminal 13 of the secondary batteries $43_1$-$43_5$, and the other end projects from the opening portion 44 of the chassis 41, and projects from the upper portion of the chassis 41.

Another example of the battery pack will be described in detail with reference to FIG. 7 and FIG. 8. FIG. 7 is an exploded perspective view of the battery pack. FIG. 8 is a block diagram showing an electric circuit of the battery pack of FIG. 7.

A plurality of unit cells 51 each composed of the flat lithium secondary battery are laminated so that negative electrode terminals 52 and positive electrode terminals 53 which extend outside are aligned in the same direction, and are bound by an adhesive tape 54, to compose an assembled battery 55. These unit cells 55 are electrically connected in series with each other, as shown in FIG. 8.

A printed wiring board 56 is arranged to face side surfaces of the unit cells 51 from which the negative electrode terminals 52 and the positive electrode terminals 53 extend. A thermistor 57, a protection circuit 58 and an outer terminal 59 for energization are mounted on the printed wiring board 56, as shown in FIG. 8. In addition, an insulating plate (not shown) is attached to a surface of the printed wiring board 56 facing the assembled battery 55, so as to avoid unnecessary connection between the wiring of the assembled battery 55 and the printed wiring board 56.

A positive electrode lead 60 is connected to the positive electrode terminal 53 located at the lowermost layer of the assembled battery 55, and its tip is inserted into a positive electrode connector 56 of the printed wiring board 56, and is electrically connected thereto. A negative electrode lead 62 is connected to the negative electrode terminal 52 located at the uppermost layer of the assembled battery 55, and its tip is inserted into a negative electrode connector 63 of the printed wiring board 56, and is electrically connected thereto. These connectors 61 and 63 are connected to the protection circuit 58 through wirings 64 and 65 formed in the printed wiring board 56, respectively.

The thermistor 57 detects a temperature of the unit cell 51, and its detection signal is transmitted to the protection circuit 58. The protection circuit 58 can break a plus side wiring 66a and a minus side wiring 66b between the protection circuit 58 and the outer terminal 59 for energization, under a prescribed condition. The prescribed condition is a time when a detection temperature of the thermistor 57 becomes not less than a prescribed temperature, for example. In addition, the prescribed condition is a time when over-charge, over-discharge, overcurrent or the like of the unit cell 51 is detected. Detection of this over-charge or the like is performed for each unit cell 51, or for the assembled battery 55. In the case of detecting each of the unit cells 51, a battery voltage may be detected, or a positive electrode potential or a negative electrode potential may be detected. In the case of the latter, a lithium electrode which is used as a reference electrode is inserted in each of the unit cells 51. In the case of FIG. 7 and FIG. 8, wirings 67 for voltage detection are connected to the respective unit cells 51, and the detection signals are transmitted to the protection circuit 58 through these wirings 67.

At three side surfaces of the assembled battery 55 except a side surface from which the positive electrode terminals 53 and the negative electrode terminals 52 project, protection sheets 68 composed of rubber or resin are respectively arranged.

The assembled battery 55 along with the respective protection sheets 68 and the printed wiring board 56 are housed in a housing container 69. That is, in the housing container 69, the protection sheets 68 are respectively arranged on the both inner side surfaces in the long side direction, and on one inner side surface in the short side direction, and the printed wiring board 56 is arranged on another inner side surface in the short side direction. The assembled battery 55 is located in the space surrounded by the protection sheets 68 and the printed wiring board 56. A lid 70 is attached to an upper surface of the housing container 69.

A heat shrinkable tape may be used, in place of the adhesive tape 54, for fixing the assembled battery 55. In this case, the protection sheets are arranged on the both side surfaces of the assembled battery 55, and a heat shrinkable tape is wound around the two protection sheets and the assembled battery 55, and then the heat shrinkable tape is thermally shrunk, to bind the assembled battery 55.

Figure 7:
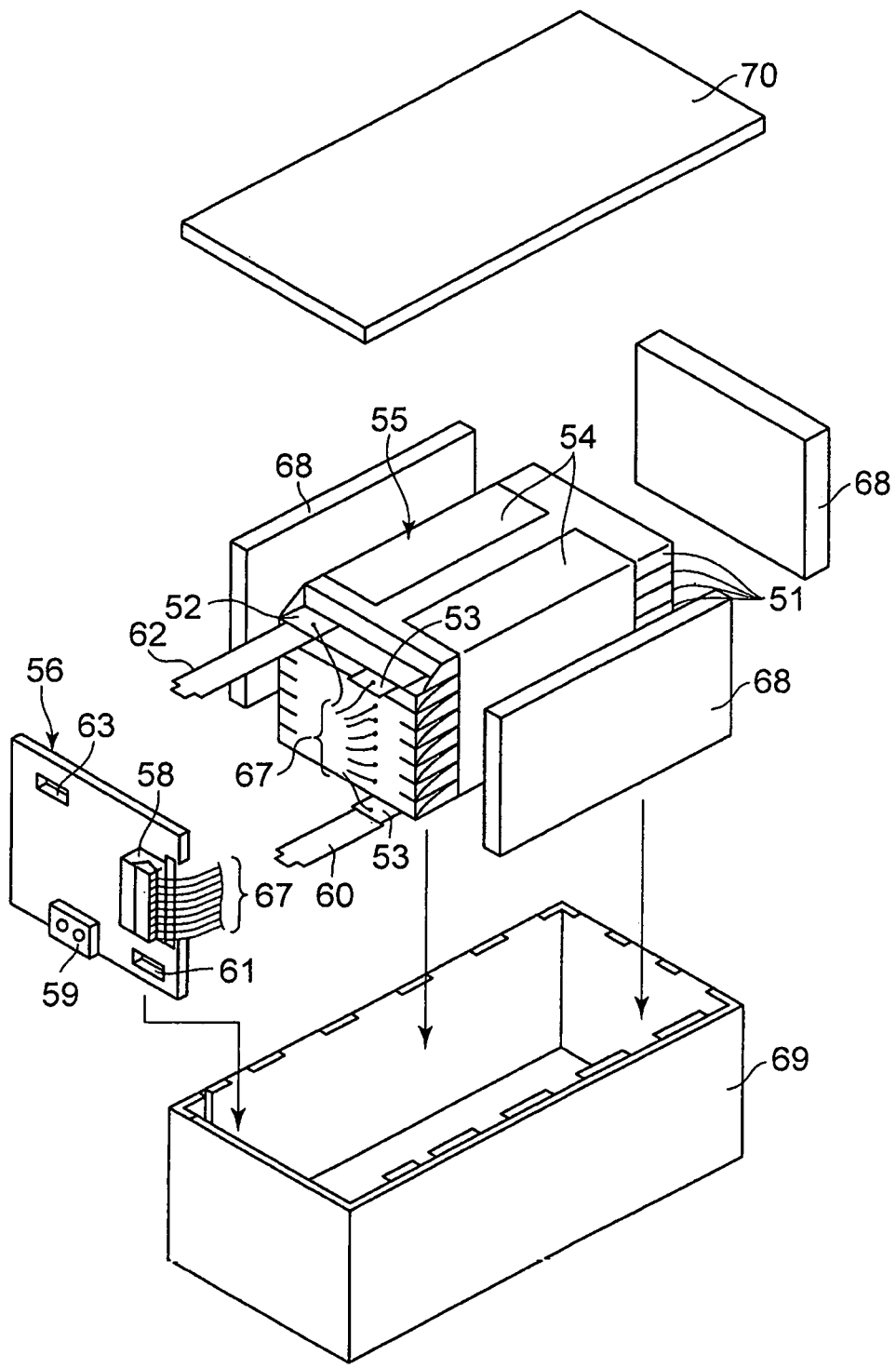
FIG. 7 is an exploded perspective view schematically showing another example of the battery pack according to the second embodiment.
Figure 8:
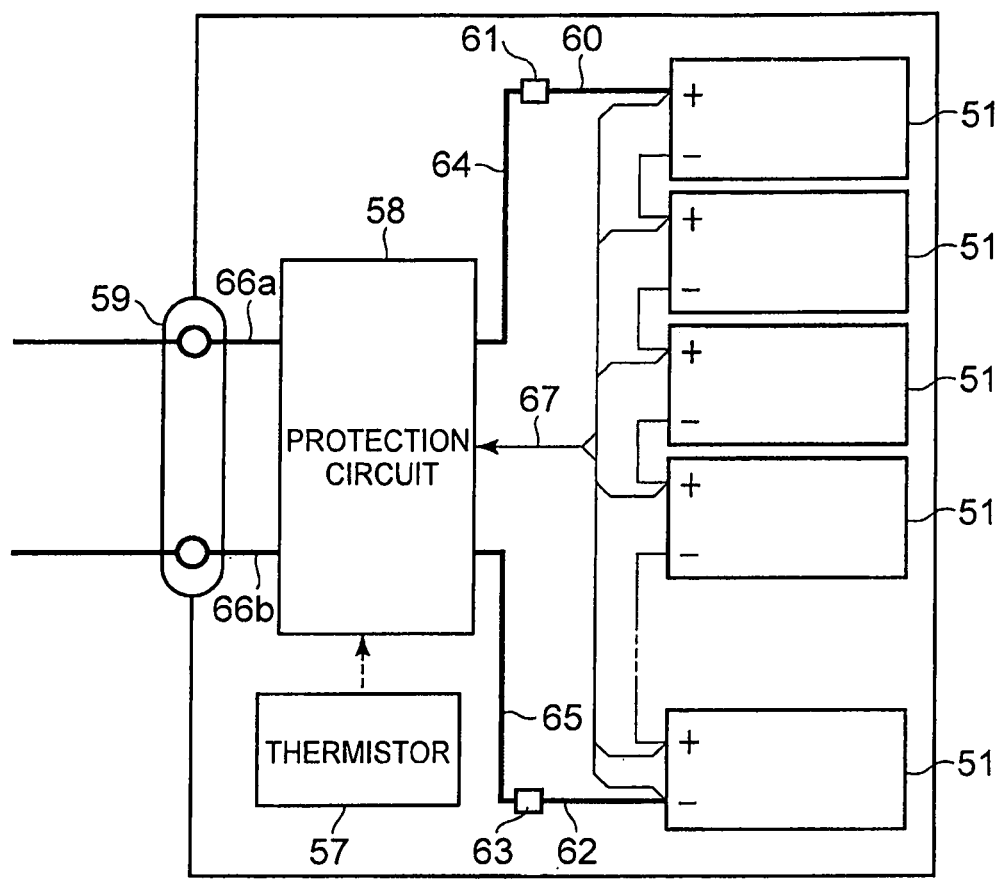
FIG. 8 is a block diagram showing an electric circuit of the battery pack shown in FIG. 7.

In FIG. 7 and FIG. 8, a configuration in which the unit cells are connected in series has been shown, but in order to increase battery capacity, they may be connected in parallel. Or a series connection and a parallel connection may be combined. The assembled battery packs may be connected in series, parallel.

In addition, an aspect of the battery pack is appropriately changed according to its usage. As a usage of the battery pack, one in which charge/discharge in large current is desired is preferable. Specifically, a usage for a power source for a digital camera, and an onboard use for a vehicle, such as a two-wheel to four-wheel hybrid electric car, a two-wheel to four-wheel electric car, an assist bicycle and so on, and a railway vehicle (an electric railcar, for example) and so on, can be listed. Particularly, the battery pack is suitable for an onboard use.

In the vehicle such as a car mounted with the battery pack according to the present embodiment, the battery pack recovers a regenerative energy of a power of the vehicle, for example.

Since the battery pack according to the second embodiment described above is provided with the secondary batteries of the first embodiment, the generation of hydrogen from the negative electrode collector can be suppressed, and it is possible to achieve excellent cycle life performance. In addition, according to the second embodiment, it is possible to provide a battery pack which is suitable as an alternative power source to a lead battery which is used as a starter power source for vehicle, or an on-vehicle secondary battery which is to be mounted on a hybrid car.

Third Embodiment

According to a third embodiment, a vehicle is provided. This vehicle is provided with the battery pack according to the second embodiment.

Figure 9:
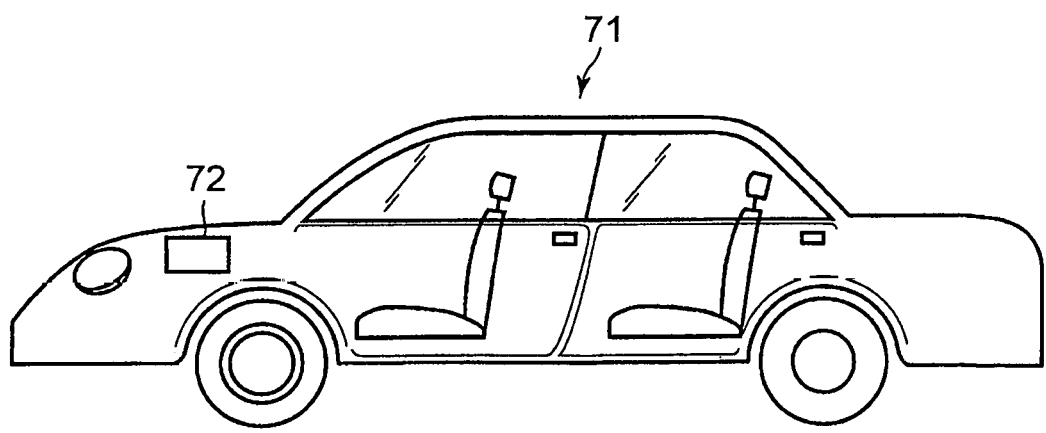
FIG. 9 is a sectional view schematically showing an example of a vehicle according to a third embodiment.

FIG. 9 is a diagram showing a vehicle provided with the battery pack according to the second embodiment.

A car 71 shown in FIG. 9 is mounted with a battery pack 72 in an engine room at the front portion in the car body. The mounting position of the battery pack in the car is not limited to the engine room. For example, the battery pack may be mounted on the backward portion in the car body of the car or under the seat.

Example

Hereinafter, examples will be described, but the embodiments are not limited to examples described below.

Example 1

<Manufacturing of Positive Electrode>

The positive electrode was manufactured as described below.

As the positive electrode active material, the conductive agent, and the binding agent, a lithium-manganese oxide ($LiMn_2O_4$) of a spinel structure with an average particle diameter of 10 μm, graphite powder, and polyacrylamide (PAI) were respectively used. These positive electrode active material, conductive agent and binding agent were blended at a ratio of 80 wt. %, 10 wt. % and 10 wt. %, respectively, and were dispersed in an N-methyl-2-pyrolidone (NMP) solvent, to prepare a slurry. The prepared slurry was applied to the both surfaces of a Ti foil of a thickness of 12 μm as the positive electrode collector, and the coated films were dried, to form the positive electrode active material layers. After a process of pressing the positive electrode collector and the positive electrode active material layers thereon, the positive electrode with an electrode density of 3.0 g/cm³ (not containing the collector) was manufactured. In addition, not only $LiMn_2O_4$ is used for the positive electrode. For example, $LiMnO_2$, $LiCoO_2$, $LiMn_{1.5}Ni_{0.5}CoO_2$ may also be used for the positive electrode, in the same manner as $LiMn_2O_4$.

<Manufacturing of Negative Electrode>

The negative electrode was manufactured as described below.

As the negative electrode active material, the conductive agent and the binding agent, $Li_4Ti_5O_{12}$ powder with an average secondary particle diameter (diameter) of 15 μm, graphite powder, and PAI were respectively used. These negative electrode active material, conductive agent and binding agent were blended respectively at a ratio of 80 wt. %, 10 wt. % and 10 wt. %, respectively, and were dispersed in an NMP solvent, to prepare a slurry. The obtained slurry was applied to a Ti foil with a thickness of 50 μm as the negative electrode collector, and the coated film was dried, to form the negative electrode active material layer. Here, at the time of applying the slurry to the Ti foil, regarding the portion to be located at the outermost circumference of the electrode group, out of the negative electrodes to be manufactured, the slurry was applied to one surface of the Ti foil, and regarding the other portions, the slurry was applied to the both surfaces of the Ti foil. After a process of pressing the negative electrode collector and the negative electrode active material layer(s) thereon, the negative electrode with an electrode density of 2.0 g/cm³ (not containing the collector) was manufactured. In addition, not only $Li_4Ti_5O_{12}$ is used for the negative electrode. For example, $TiO_2$ (rutile type), $Nb_2TiO_7$, $La_{1.8}NiTiO_6$ may be used for the negative electrode in the same manner as $Li_4Ti_5O_{12}$.

<Manufacturing of Electrode Group>

The positive electrode manufactured as described above, a nonwoven fabric separator made of cellulose fiber with a thickness of 20 μm, the negative electrode manufactured as described above, and another nonwoven fabric separator were laminated in this order, to obtain a laminated body. And this laminated body was winded in a spiral shape so that the negative electrode is located at the outermost circumference, to manufacture the electrode group. This was subjected to hot pressing at 90° C., to manufacture the flat electrode group. The obtained electrode group was housed in a thin metal can made of stainless steel with a thickness of 0.25 mm. In addition, as the metal can, a can installed with a valve which leaks the gas at an inner pressure of not less than 2 atmospheric pressures is used.

<Preparation of Electrolytic Solution>

3 M of LiCl and 0.25 M of $Li_2SO_4$ as electrolyte salts were dissolve into 1 L of an electrolytic solution in which water and methanol as the organic solvent were mixed at a ratio of 95 vol. % and 5 vol. %, to obtain the electrolytic solution.

<Manufacturing of Secondary Battery and Initial Charge/Discharge>

A kind of the negative electrode active material, a kind of the positive electrode material, a kind of the electrolytic solution, and a relative permittivity estimated from additive property to volume fractions thereof are summarized in Table 1 described below.

TABLE 1

| | negative electrode active material | positive electrode active material | composition of electrolytic solution (vol. %) | relative permittivity |
|---|---|---|---|---|
| example 1 | $Li_4Ti_5O_{12}$ | $LiMn_2O_4$ | water:methanol = 95:5 | 77.75 |

The electrolytic solution prepared as described above was injected in the metal container in which the electrode group had been housed, to manufacture the secondary battery having the structure shown in FIG. 1. After the electrolytic solution had been injected, the secondary battery was left for 24 hours under the 25° C. environment. Then, the secondary battery was subjected to initial charge/discharge under the 25° C. environment. In the initial charge/discharge, the secondary battery was charged to 2.8 V with a constant current of 5 A, and then was discharged to 1.5 V with a constant current of 1 A. In addition, at the time of the initial charge/discharge, the capacity of the secondary battery was confirmed. (examples 2-11, comparative examples 1 and 2).

Secondary batteries according to examples 2-11 and comparative examples 1 and 2 were respectively manufactured by the same method as described in the example 1, except that a kind of the negative electrode active material, a kind of the positive electrode material, a kind of the electrolytic solution, and a relative permittivity were changed as shown in Table 2 described below, and were subjected initial charge/discharge.

In the example 7, $Li_4Ti_5O_{12}$ and $TiO_2$ of a rutile type were used as the negative electrode active material at a weight ratio of 80:20. In addition, relative permittivities of the organic solvents used in the electrolytic solution are as follows: methanol: 33, isopropanol: 20.18, acetonitrile: 36.64, DMSO: 47.24. In addition, these values were referred to from "CRC Handbook of CHEMISTRY and PHYSICS" (CRC Press LLC).

TABLE 2

|  | negative electrode active material | positive electrode active material | composition of electrolytic solution (vol. %) | relative permittivity |
| --- | --- | --- | --- | --- |
| example 2 | $Li_4Ti_5O_{12}$ | $LiMn_2O_4$ | water:isopropanol = 95:5 | 77.1 |
| example 3 | $Li_4Ti_5O_{12}$ | $LiMn_2O_4$ | water:acetonitrile = 95:5 | 77.93 |
| example 4 | $Li_4Ti_5O_{12}$ | $LiMn_2O_4$ | water:methanol = 90:10 | 75.4 |
| example 5 | $Li_4Ti_5O_{12}$ | $LiMn_2O_4$ | water:methanol = 75:25 | 68.33 |
| example 6 | $Li_4Ti_5O_{12}$ | $LiMn_2O_4$ | water:methanol:DMSO = 95:5:5 | 76.1 |
| example 7 | $Li_4Ti_5O_{12}/TiO_2$ (rutile type) 80/20(wt. %) | $LiMn_2O_4$ | water:methanol = 95:5 | 77.75 |
| example 8 | $Nb_2TiO_7$ | $LiMn_2O_4$ | water:methanol = 95:5 | 77.75 |
| example 9 | $NaNbTiO_6$ | $LiMn_2O_4$ | water:methanol = 95:5 | 77.75 |
| example 10 | $Li_4Ti_5O_{12}$ | $LiCoO_2$ | water:methanol = 95:5 | 77.75 |
| example 11 | $Li_4Ti_5O_{12}$ | $LiMnPO_4$ | water:methanol = 95:5 | 77.75 |
| comparative example 1 | $Li_4Ti_5O_{12}$ | $LiMn_2O_4$ | water = 100 | 80.1 |
| comparative example 2 | $Li_4Ti_5O_{12}$ | $LiMn_2O_4$ | water:DMSO = 95:5 | 78.46 |

<Evaluation of Average Operating Voltage and Evaluation of Life Performance>

Regarding each of the secondary batteries manufactured in the examples 1-11 and the comparative examples 1 and 2, an average operating voltage at the time of performing the initial charge/discharge was evaluated. In addition, regarding each of the secondary batteries manufactured in the examples 1-11 and the comparative examples 1 and 2, a test for evaluating the cycle life performance was performed as described below. These results are shown in Table 3 described below.

TABLE 3

|  | average operating voltage | Charge/discharge efficiency at 50th cycle |
| --- | --- | --- |
| example 1 | 2.44 V | 87% |
| example 2 | 2.43 V | 89% |
| example 3 | 2.43 V | 85% |
| example 4 | 2.44 V | 91% |
| example 5 | 2.46 V | 94% |
| example 6 | 2.42 V | 90% |
| example 7 | 2.31 V | 90% |
| example 8 | 2.61 V | 86% |
| example 9 | 2.73 V | 86% |
| example 10 | 2.42 V | 87% |
| example 11 | 1.89 V | 88% |
| comparative example 1 | 2.42 V | 54% |
| comparative example 2 | 2.43 V | 55% |

The secondary battery was charged to 2.8 V with a constant current of 3 A under the 25° C. environment, and then a resting time of 30 minutes was provided. Next the secondary battery was discharged to 1.5 V, and then a resting time of 30 minutes was provided again. A cycle from the charging to the termination of the resting time was determined as a charge/discharge cycle of one time. This charge/discharge cycle was repeated for 50 times. From the charge capacity and the discharge capacity in the 50th charge/discharge cycle, a charge/discharge efficiency (discharge capacity/charge capacity) (%) was calculated. In Table 3, "charge/discharge efficiency" indicates a value calculated from the charge capacity and the discharge capacity in the 50th charge/discharge cycle.

As shown in Table 3, each of the lithium secondary batteries of the examples 1-11 indicated a higher charge/discharge efficiency, even after the charge/discharge cycle had been repeated for 50 times compared with the comparative example 1. Out of the examples using $Li_4Ti_5O_{12}$ as the negative electrode active material, the higher the mixing ratio of methanol in the example was, the more excellent charge/discharge efficiency the example indicated. The example 3 in which the organic solvent to be mixed is acetonitrile indicated a slightly lower efficiency than the example 1, but the example 2 in which the organic solvent to be mixed is isopropanol indicated a lower relative permittivity along with a more excellent charge/discharge efficiency than the example 1.

In addition, in each of the examples 8 and 9 in which the kind of the negative electrode active material had been changed to niobium-titanium oxide or sodium-niobium-titanium oxide respectively, a sufficient charge/discharge efficiency was attained and a high average operating voltage was also attained.

Figure 10:
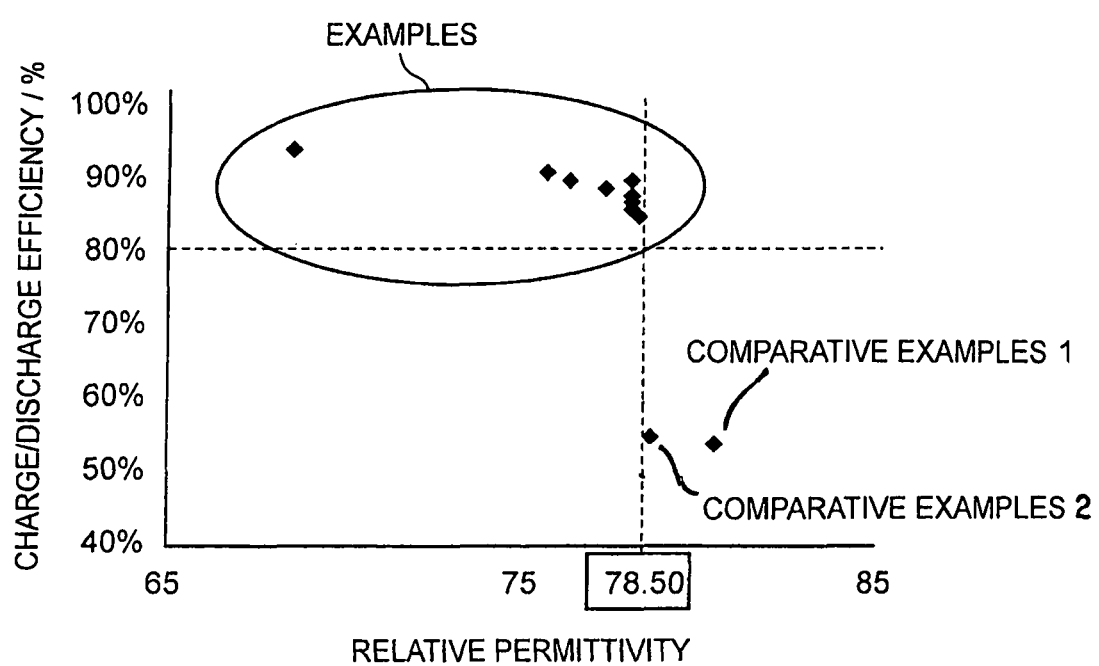
FIG. 10 is a diagram showing the relation between Table 2 and Table 3.

FIG. 10 shows the relation between Table 2 and Table 3.

As shown in FIG. 10, in the comparative example 1 with a relative permittivity of more than 78.50 in the electrolytic solution, the charge/discharge efficiency thereof is remarkably decreased compared with the examples. In addition, the comparative example 2 has a relative permittivity of not more than 78.50, but only DMSO with a relative permittivity of more than 42 is mixed with water therein, and accordingly the charge/discharge efficiency thereof is remarkably decreased compared with the examples.

In addition, in each of the examples 10 and 11 in which the kind of the positive electrode active material was changed to lithium-cobalt composite oxide or lithium phosphoric acid compound having an olivine structure, a sufficient charge/discharge efficiency was attained. Here, relative permittivities of water and the organic solvents used in in the electrolytic solutions of the above-described examples and comparative examples are listed in Table 4. Data is cited from "Handbook of CHEMISTRY and PHYSICS".

TABLE 4

| | relative permittivity |
|---|---|
| tetrahydrofuran (THF) | 7.52 |
| isopropyl alcohol (IPA) | 20.18 |
| methanol | 33 |
| ethanol | 25.3 |
| N-methyl-2-pyrolidone (NMP) | 32.2 |
| acetonitrile | 36.64 |
| dimethyl formamide (DMF) | 38.25 |
| γ-butyro lactone (GBL) | 39 |
| methyl acetate | 7.07 |
| ethylene glycol | 41.4 |
| dimethyl sulfoxide (DMSO) | 47.24 |
| water | 80.1 |

According to at least one embodiments described above, the electrolytic solution is an electrolytic solution in which a nonaqueous solvent with a relative permittivity of not more than is mixed and which has a relative permittivity converted according to a volume fraction is not more than 78.50, it is possible to suppress generation of hydrogen from the collector, and it is possible to attain excellent life performance.

Figure 11:
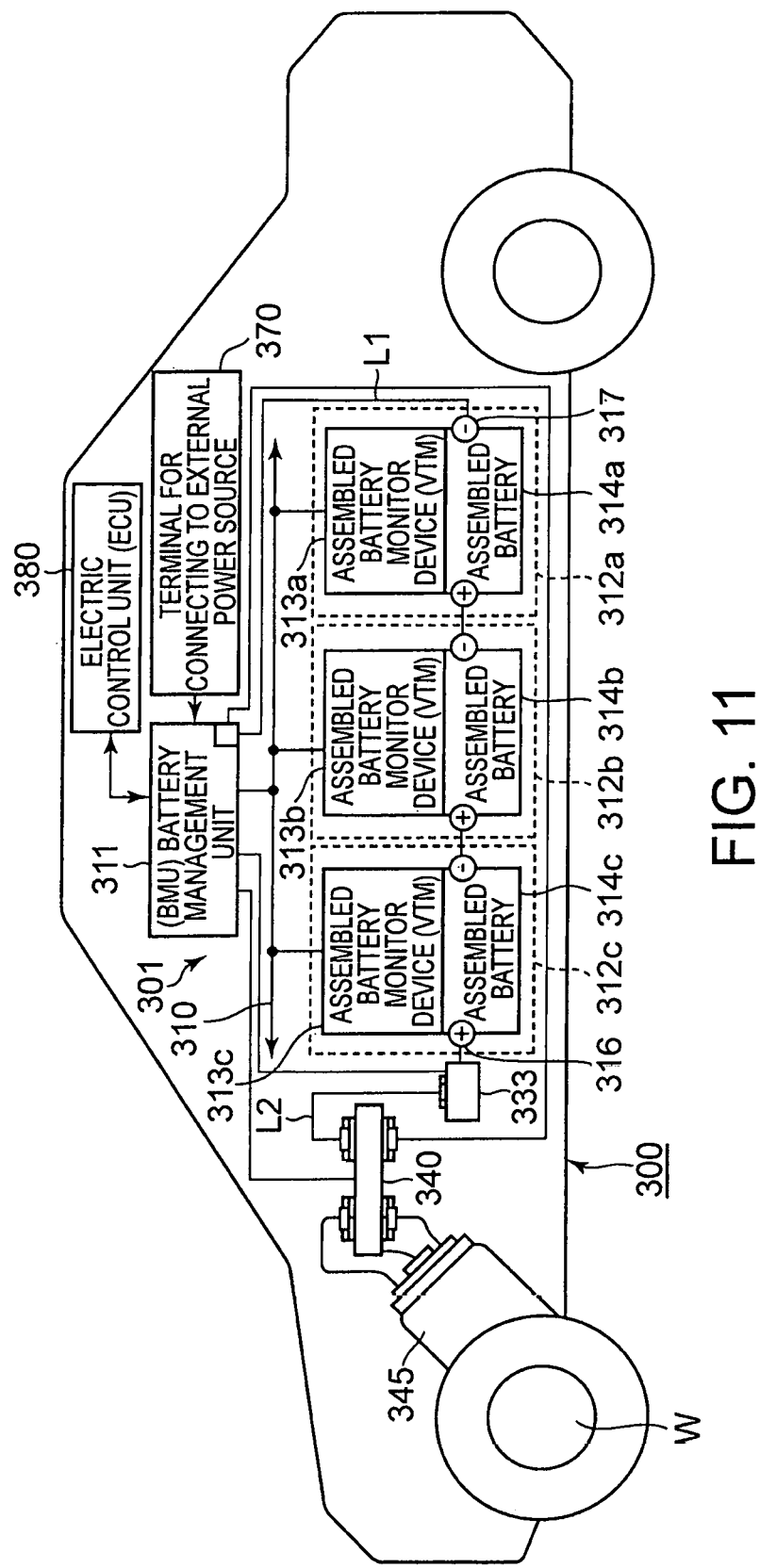
FIG. 11 is a diagram schematically a configuration of a vehicle of an example 13.

Example 12 In an example 12, a vehicle of the example 12 having a configuration schematically shown in FIG. 11, using the secondary battery of the embodiments 1-11, was manufactured.

Hereinafter, a configuration of the vehicle of the example 12 will be described with reference to FIG. 11.

FIG. 11 is a diagram schematically showing a configuration of the vehicle of the example 12. A vehicle 300 shown in FIG. 11 is an electric car.

The vehicle 300 shown in FIG. 11 is provided with a vehicle power source 301, a vehicle ECU (Electric Control Unit) 380 that is host control means of the vehicle power source 301, an outer terminal 370, an inverter 340, a drive motor 345.

The vehicle 300 is mounted with the vehicle power source 301 in an engine room, on the backward portion in the car body of the car, or under the sheet, for example. However, the mounting place of the secondary batteries on the vehicle 300 is schematically shown in FIG. 11.

The vehicle power source 301 is provided with a plurality of (three, for example) battery packs 312a, 312b and 312c, a battery management unit (BMU: Battery Management Unit) 311, a communication bus 310.

The three battery packs 312a, 313b and 312c are electrically connected in series. The battery pack 312a is provided with an assembled battery 314a and an assembled battery monitor device (VTM: Voltage Temperature Monitoring) 313a. The battery pack 312b is provided with an assembled battery 314b and an assembled battery monitor device 313b. The battery pack 312c is provided with an assembled battery 314c and an assembled battery monitor device 313c. Each of the battery packs 312a, 312b and 312c can be detached independently, and can be changed for another battery pack.

Each of the assembled batteries 314a-314c is provided with a plurality of series-connected secondary batteries. Each of the secondary batteries is a battery which has been manufactured in the same manufacturing procedure as the manufacturing procedure of the secondary battery of the example 1. Each of the assembled batteries 314a-314c is charged/discharged through a positive electrode terminal 316 and a negative electrode terminal 317.

The battery management unit 311, in order to collect information relating to maintenance of the vehicle power source 301, performs communication of information such as voltages and temperatures of the secondary batteries in the assembled batteries 314a-314c contained in the vehicle power source 301, with the assembled battery monitor devices 313a-313c, to collect the information.

The communication bus 310 is connected between the battery management unit 311 and the assembled battery monitor devices 313a-313c. The communication bus 310 is configured so that a set of communication lines is shared by a plurality of nodes (the battery management unit and one or more assembled battery monitor devices). The communication bus is a communication bus configured based on the CAN (Control Area Network) standard.

The assembled battery monitor devices 313a-313c measure voltages and temperatures of the secondary batteries composing the assembled batteries 314a-314c, respectively, based on an instruction by communication from the battery management unit 311. However, the temperature may be measured at several places for each assembled battery, and the temperatures of the all secondary batteries need not be measured.

The vehicle power source 301 may have an electromagnetic contactor (a switch device 333 shown in FIG. 11, for example) for switching the connection between the positive electrode terminal and the negative electrode terminal. The switch device 333 contains a precharge switch (not shown) which is turned ON when charging of the assembled batteries 314a-314c is performed, and a main switch (not shown) which is turned ON when the battery output is supplied to a load. Each of the precharge switch and the main switch is provided with a relay circuit (not shown) which is turned ON and OFF by a signal supplied to a coil arranged in the vicinity of a switch element.

The inverter 340 converts an inputted DC voltage into a three-phase high AC voltage for driving motor. The inverter 340 is controlled of its output voltage, based on a control signal from the battery management unit 311 described later, or a control signal from the vehicle ECU 380 for controlling the whole vehicle operation. The three-phase output terminals of the inverter 340 are respectively connected to the three-phase input terminals of the drive motor 345.

The drive motor 345 is rotated by the power supplied from the inverter 340, and transmits the rotation to an axle and a drive wheel W, via a differential gear unit, for example.

In addition, though not shown in the drawing, the vehicle 300 is provided with a regenerative braking mechanism which rotates the drive motor 345 when the vehicle 300 is braked, and converts the kinetic energy into the regenerative energy as the electric energy. The regenerative energy restored by the regenerative braking mechanism is inputted into the inverter 340, and is converted into a DC current. The DC current is inputted to the vehicle power source 301.

One terminal of a connection line L1 is connected to the negative electrode terminal 317 of the vehicle power source 301. The other terminal of the connection line L1 is connected to a negative electrode input terminal of the inverter 340 via a current detection portion (not shown) in the battery management unit 311.

One terminal of a connection line L2 is connected to the positive electrode terminal 316 of the vehicle power source 301, via the switch device 333. The other terminal of the connection line L2 is connected to a positive electrode input terminal of the inverter 340.

The outer terminal 370 is connected to the battery management unit 311 described later. The outer terminal 370 may connect to an external power source, for example.

The vehicle ECU 380 controls the battery management unit 311 in cooperation with another device, in response to an operation input by a driver or the like, and thereby manages the whole vehicle. Data relating to the maintenance of the vehicle power source 301 such as a remaining capacity or the like of the vehicle power source 301 is transferred by the communication line, between the battery management unit 311 and the vehicle ECU 380.

The batteries are used in the vehicle 300 of FIG. 11, and thereby the effect of the embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery, comprising:
an electrolytic solution; and
a positive electrode and a negative electrode which are immersed in the electrolytic solution;
the electrolytic solution containing water, an electrolyte salt, and at least one kind of an organic solvent with a relative permittivity of not more than 42,
a relative permittivity of the electrolytic solution when converted according to a volume fraction being not more than 78.50,
wherein the positive electrode comprises one or more kinds of positive electrode active materials selected from a lithium-manganese composite oxide, a lithium-nickel composite oxide, a lithium-cobalt-aluminum composite oxide, a lithium-nickel-cobalt-manganese composite oxide, a spinel type lithium-manganese-nickel composite oxide, a lithium-manganese-cobalt composite oxide, a lithium-iron composite oxide, lithium iron fluorosulfate, and a lithium phosphate compound of an olivine crystal structure,
wherein the negative electrode comprises negative electrode active material which is a titanium-containing oxide selected from one of a lithium-titanium oxide, a niobium-titanium oxide, and a sodium-niobium-titanium oxide,
wherein an average operating voltage of the secondary battery is equal to or greater than 1.8 V, and
wherein the negative electrode comprises an active material having a specific surface area determined by BET (Brunauer, Emmett and Teller) method that is not less than 3 $m^2$/g and not more than 200 $m^2$/g, and
wherein a ratio of the organic solvent in the electrolytic solution is smaller than 50 vol. %.

2. The secondary battery according to claim 1, wherein:
the relative permittivity of the electrolytic solution is not more than 77.93.

3. The secondary battery according to claim 1, wherein:
pH of the electrolytic solution is within a range of 1-14.

4. The secondary battery according to claim 1, wherein:
pH of the electrolytic solution is adjusted by adding LiOH or $Li_2SO_4$ to the electrolytic solution.

5. The secondary battery according to claim 1, wherein:
the electrolytic, solution is gelated by adding a polymer material to the electrolytic solution.

6. The secondary battery according to claim 1, wherein:
the organic solvent with a relative permittivity of not more than 42 is at least one kind selected from a group consisting of alcohols and an aprotic, polar solvent.

7. The secondary battery according to claim 6, wherein:
the organic solvent is at least one kind selected from isopropanol, acetonitrile, and methanol.

8. The secondary battery according to claim 1, wherein:
the electrolyte salt is a lithium salt.

9. The secondary battery according to claim 8, wherein:
the electrolyte salt is dissolved in the electrolytic solution at a concentration of 1 M-12 M.

10. The secondary battery according to claim 9, wherein:
the electrolyte salt is dissolved in the electrolytic solution at a concentration of 6 M-12 M.

11. The secondary battery according to claim 1, wherein:
the positive electrode contains an active material; and
the active material is at least $LiMn_2O_4$.

12. A battery pack comprising:
at least one of the secondary battery according to claim 1.

13. The battery pack according to claim 12, further comprising:
an outer terminal for energization; and
a protection circuit.

14. The battery pack according to claim 12, wherein:
the battery pack comprises a plurality of the secondary battery, the secondary batteries being electrically connected in series, in parallel, or by combining a series-connection and a parallel-connection.

15. A vehicle, comprising:
the battery pack according to claim 12.

16. The vehicle according to claim 15, wherein:
the battery pack is configured to recover a regenerative energy of a drive motor of the vehicle.

17. The secondary battery according to claim 1, wherein the electrolytic solution is liquid.

18. The secondary battery according to claim 1, wherein the electrolytic solution includes 5% by volume of the at least one kind of the organic solvent with the relative per of not more than 42.

* * * * *